(12) United States Patent
Wigmore et al.

(10) Patent No.: US 9,733,846 B1
(45) Date of Patent: Aug. 15, 2017

(54) INTEGRATED BACKUP PERFORMANCE ENHANCEMENTS BY CREATING AFFINITY GROUPS

(71) Applicant: EMC Corporation, Hopkinton, MA (US)

(72) Inventors: Ian Wigmore, Westborough, MA (US); Stephen Smaldone, Woodstock, CT (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 14/576,193

(22) Filed: Dec. 18, 2014

(51) Int. Cl.
*G06F 3/06* (2006.01)
*G06F 12/10* (2016.01)

(52) U.S. Cl.
CPC .......... *G06F 3/0619* (2013.01); *G06F 3/065* (2013.01); *G06F 3/0689* (2013.01); *G06F 12/10* (2013.01)

(58) Field of Classification Search
CPC ........ G06F 3/067; G06F 3/0683; G06F 12/10; G06F 13/14
See application file for complete search history.

(56) References Cited

U.S. PATENT DOCUMENTS

| | | | | |
|---|---|---|---|---|
| 8,768,981 B1* | 7/2014 | Milne | ............... | G06F 17/30194 707/822 |
| 2004/0128456 A1* | 7/2004 | Kobayashi | ............ | G06F 3/0611 711/162 |
| 2005/0015685 A1* | 1/2005 | Yamamoto | .......... | G06F 11/0727 714/54 |
| 2007/0124407 A1* | 5/2007 | Weber | ................... | G06F 3/0607 709/212 |
| 2011/0029730 A1* | 2/2011 | Durocher | ............ | G06F 12/0866 711/114 |
| 2013/0121209 A1* | 5/2013 | Padmanabhan | ..... | H04L 41/0823 370/255 |
| 2014/0040212 A1* | 2/2014 | Yochai | .................. | G06F 3/0635 707/687 |
| 2015/0169229 A1* | 6/2015 | Tsuchiya | ............... | G06F 3/0608 711/114 |

\* cited by examiner

*Primary Examiner* — Hal Schnee
(74) *Attorney, Agent, or Firm* — Blakely, Sokoloff, Taylor & Zafman LLP (57) ABSTRACT

A method in a backup engine is described. The method includes receiving a data access request for a data element in a logical storage volume for one of a read or write operation, determining an affinity group associated with the data element based on an affinity group list indicating a physical storage volume for the data element based on the data address range for the data element, determining a first frontend adapter identifier (ID) from the first affinity group associated with the data element, the first frontend adapter ID identifying a first frontend adapter associated with a first physical storage volume, and transmitting the data access request to the first frontend adapter based on the first frontend adapter ID to execute the data access request on the first physical storage volume.

18 Claims, 7 Drawing Sheets

| Affinity Groups for Backup Engine (BE) 430 | | | |
|---|---|---|---|
| Logical Volume (LV) ID 402 | Address (I/O) Range 404 | Frontend Adapter (FA) ID 408 | Disk Adapter (DA) ID 410 |
| 412 | 420 (e.g., 0x0000-0x0100) | 440 (Local) | 450 |
| 412 | 421 (e.g., 0x0101-0x1100) | 444 (Remote) | 452 |
| 414 | 422 (e.g., 0x0000-0x1000) | 440 (Local) | 450 |
| 414 | 423 (e.g., 0x1001-0x1111) | 447 (Remote) | 454 |
| 416 | 424 (e.g. 0x0000-0x0110) | 444 (Remote) | 453 |
| 416 | 425 (e.g. 0x0111-0x1010) | 440 (Local) | 450 |
| 416 | 426 (e.g. 0x1011-0x1111) | 447 (Remote) | 454 |
| ... | ... | ... | ... |

| Affinity Groups for Backup Engine (BE) 432 | | | |
|---|---|---|---|
| Logical Volume (LV) ID 402 | Address (I/O) Range 404 | Frontend Adapter (FA) ID 408 | Disk Adapter (DA) ID 410 |
| 412 | 420 (e.g., 0x0000-0x0100) | 441 | 450 |
| 412 | 421 (e.g., 0x0101-0x1100) | 443 | 452 |
| 414 | 422 (e.g., 0x0000-0x1000) | 441 | 450 |
| 414 | 423 (e.g., 0x1001-0x1111) | ... | ... |
| 416 | 424 (e.g. 0x0000-0x0110) | ... | ... |
| 416 | 425 (e.g. 0x0111-0x1010) | ... | ... |
| 416 | 426 (e.g. 0x1011-0x1111) | ... | ... |
| ... | ... | ... | ... |

| Affinity Groups for Backup Engine (BE) 434 | | | |
|---|---|---|---|
| Logical Volume (LV) ID 402 | Address (I/O) Range 404 | Frontend Adapter (FA) ID 408 | Disk Adapter (DA) ID 410 |
| 412 | 420 (e.g., 0x0000-0x0100) | 442 | 450 |
| ... | ... | ... | ... |

INTEGRATED BACKUP PERFORMANCE ENHANCEMENTS BY CREATING AFFINITY GROUPS

FIELD OF THE INVENTION

Embodiments of the present invention relate generally to data storage systems. More particularly, embodiments of the invention relate to integrated backup performance enhancements by creating affinity groups.

BACKGROUND

Some enterprise storage (backup) systems may be comprised of many separate physical storage volumes, with each physical storage volume controlled by external control logic and local disk access modules, and with the separate physical storage volumes represented to a host system as one or more logical volumes. These control logic modules and disk access modules are typically separate hardware elements in the system, and each may also include software or firmware. When a host system transmits an access request to the storage system, unlike consumer storage systems which only include a single connection to the storage, in these enterprise storage systems, which are sometimes called "active-active" arrays, the request may be received at any one of the control logic modules in the system. Thus, in such a system, the data may be located on a separate physical storage volume. In such a case, after the control logic device sends the access request to the disk access module, the disk access module may have to communicate with a remote disk access module that is physically connected to the desired physical storage volume. Such a remote access is slow compared to accessing the physical volume directly connected to the disk access module.

One existing solution to such a problem is that the control logic module may attempt to access the disk access modules of the storage volume in a round robin fashion. Thus, if a system has four disk access modules, then a control logic module may send requests first to the first module, then the second, the third, and the fourth, before returning to the first. In this fashion, for certain access requests, the request is sent to the disk access module that has the requested data on a locally connected physical storage volume. This improves the speed of the access. However, while this may improve performance over accessing one of the disk access modules, it is still random and does not always access the best disk access module.

Thus, it would be desirable to have a better method of accessing the data on the physical storage volumes of these enterprise storage systems.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
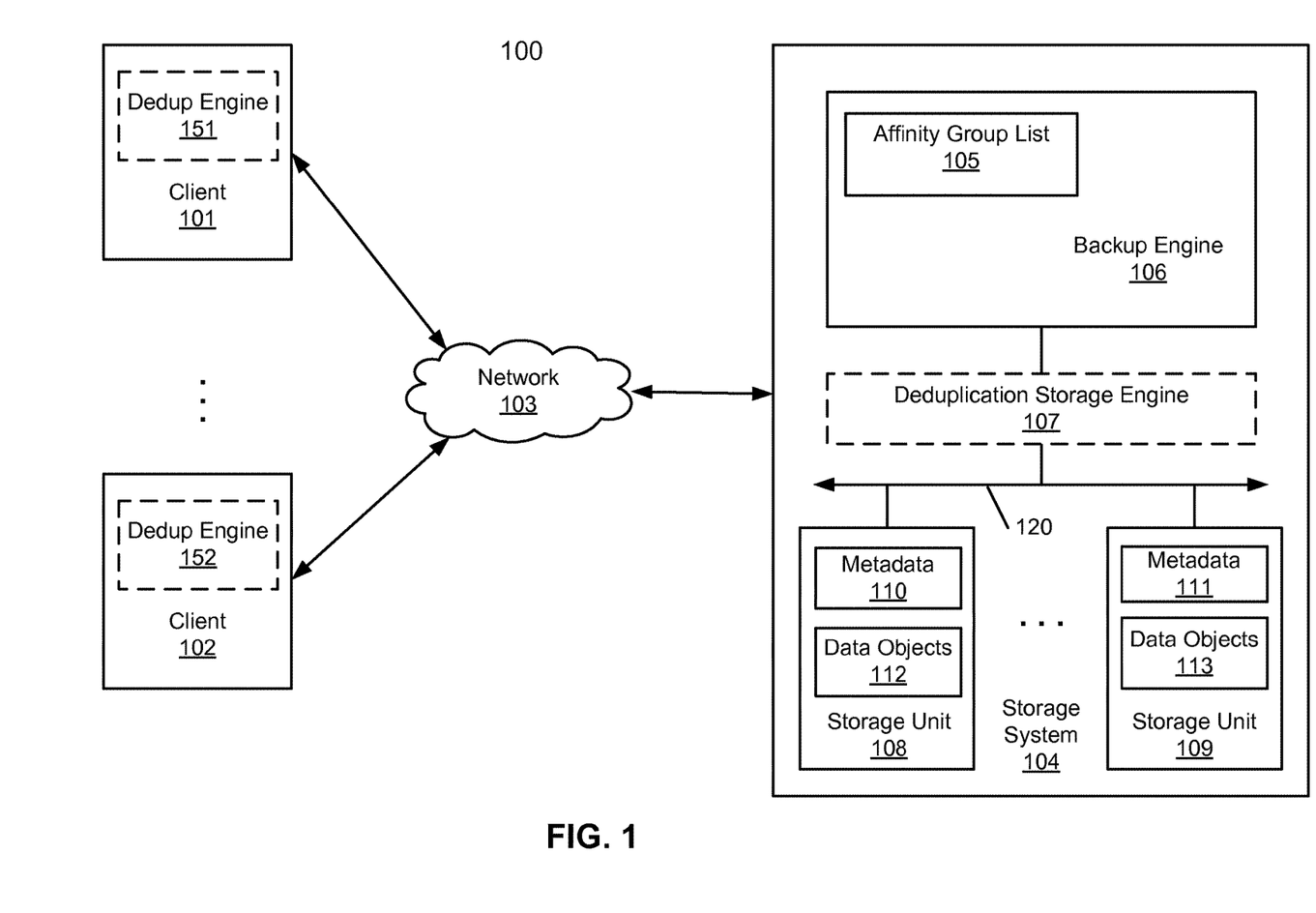
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, any of clients 101-102 may further include an optional deduplication engine (e.g., deduplication engines 151-152) having at least a portion of functionalities of deduplication engine 107. Deduplication engines 151-152 are configured to perform local deduplication operations, respectively. For example, prior to transmit data to storage system 104, each of the deduplication engines 151-152 may deduplicate the data into deduplicated segments and determine whether a particular deduplicated segment has been stored in storage system 104. A deduplicated segment is transmitted to storage system 104 only it has not been stored in storage system 104.

For example, when client 101 is about to transmit a data stream (e.g., a file or a directory of one or more files) to storage system 104, deduplication engine 151 is configured to deduplicate the data stream into deduplicated segments. For each of the deduplicated segments, client 101 transmits a fingerprint of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic and the processing resources required can be greatly reduced.

In some embodiments, backup engine 106 includes the functionality of deduplication storage engine 107. In some embodiments, the system 100 includes one or more storage systems 104, wherein each storage system includes a backup engine and one or more storage units 108. In these embodiments, the storage system is improved such that one or more storage units 108 may be connected directly to a corresponding backup engine 106 via a fast and high bandwidth connection such as through the use of shared memory.

These one or more storage systems may further be connected via a interconnect, such as interconnect 120, and may communicate with each other via additional mechanisms such as a global shared memory. The storage units 108 may include physical storage volumes, and the physical storage volumes from multiple storage systems 104 may be represented to a connected host or client as one or more logical volumes. The storage units 108 may also include additional components such as front end adapters, disk adapters, etc., to facilitate the access of data. The storage system 104 may also include additional components, such as input/output (I/O) devices, driver modules, and other components.

In these embodiments, the backup engine 106 includes additional control logic or mapping data to map data elements in one or more logical volumes to the various physical storage units (e.g., affinity group list 105). In such an embodiment, when the backup engine 106 receives a request to access a data element, the backup engine 106 can determine the storage unit that the data element is located at. The backup engine 106 then reroutes the request to the determined storage unit to execute the data access request.

This may greatly improve performance over traditional systems. In traditional systems, the backup engine(s) and the storage units may be separate entities, and so the communications between the backup engine and the storage units is relatively slow. This bottleneck prevents the system from being able to share mapping data between the storage units and the backup engine(s), and so the backup engine sends a data access request to a default storage unit when the backup engine receives a request. This default storage unit then communicates with the remote storage unit that has the physical disk that has the location of the data element. This communications is slow and inefficient. Some backup engines attempt to mitigate this issue by selecting storage units in a round robin fashion. However, while this may improve the chances of selecting a storage unit that has the correct local disk, it is still a random process and so is not fully optimized. A traditional system may also provide less performance because of the use of different communication mechanisms between different storage units (e.g., this may occur when the components were purchased at different time periods).

Thus, this improved approach, with multiple backup engines connected locally to the storage units and having knowledge of the mapping of data, allows the backup units to optimize the selection of the storage units for data access requests and greatly improve performance. This improved system will be further described with reference to FIGS. 2-6.

In some embodiments, this improved system is included as part of Data Domain/Symmetrix® of EMC Corporation (Hopkinton, Mass.).

Figure 2:
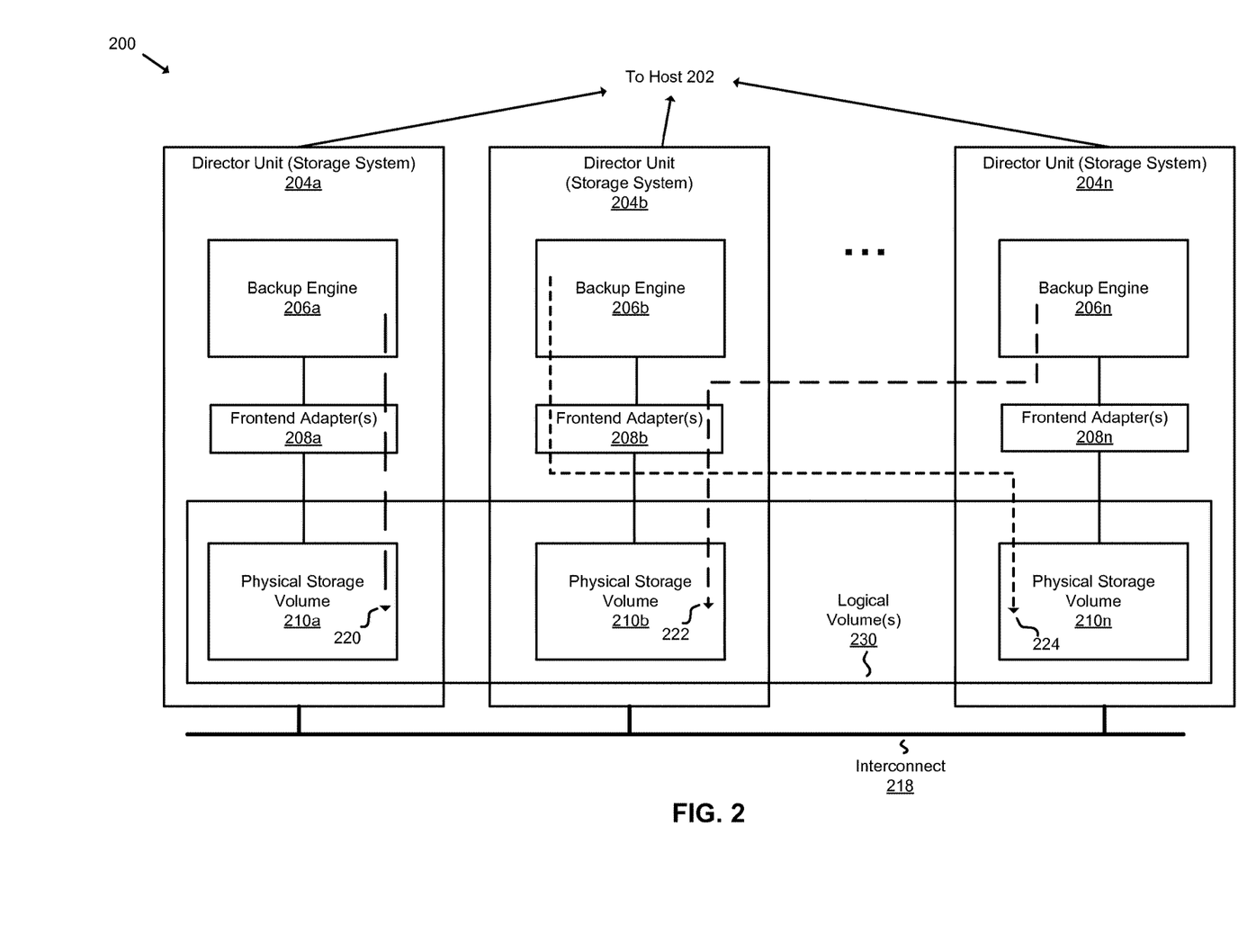
FIG. 2 is a block diagram illustrating a system 200 for an improved active-active storage array according to an embodiment of the invention.

FIG. 2 is a block diagram illustrating a system 200 for an improved active-active storage array according to an embodiment of the invention. System 200 includes multiple director units 204a-204n. In some embodiments, each of these may be a storage system 104. In some embodiments, each director unit is a control logic module. These director units 204 may be implemented as hardware units, such as a hardware circuit board in a storage server, or may be implemented via software, or a combination of both.

Each director unit 204 may receive input and send output to a host, as indicated by 202. This host may be a media provider, a server, a client, or other device which may request or send data to the director units 204.

The data received or sent through to the host 202 is processed by the backup engines 206a-206n that reside on the respective director units 204. In some embodiments, these backup engines may be comprised of software executing on a virtual machine on general purpose hardware on the director unit. In some embodiments, the director units 204 includes special purpose hardware to execute the logic of the backup engines.

In some embodiments, the backup engines 206 are each connected to one or more frontend adapter(s) 208a-208n.

These frontend adapters 208 are further connected to the physical storage 210a-210n on each director unit 204. Thus, the frontend adapters 208 serve as an interface between the backup engines, which may be software, and the physical storage. Thus, in some embodiments, these frontend adapters 208 include a software and a hardware component. Although the front end adapters are labeled as "frontend adapters" with reference to the figures in this application, note that in some embodiments these adapters have different names (e.g., a storage adapter).

The physical storage volumes 210 may include one or more types of computer readable physical storage medium. These may include, but are not limited, to those storage medium and storage devices described with reference to FIG. 2. These physical storages 210 may be configured in such a way so that the host sees the physical storage as one or more logical volume(s) 230. Thus, the host may see the one or more physical storage volumes as a configuration of one or more logical volumes such that the physical storage volume and the logical volumes do not bear any correspondence to each other. For example, a logical volume may span multiple physical storage volumes with each physical storage volume possibly holding an unequal portion of the logical volume.

The director units 204 are also connected via an interconnect 218. This interconnect may be based on a variety of high speed interconnect technologies, such as Infiniband (Infiniband Trade Association), Gigabit Ethernet, Fibre Channel, Fibre Channel over IP, SCSI, iSCSI, shared global memory, etc. In some embodiments, the director units 204 may be connected via more than one type of interconnect. For example, the backup engines 206 and/or the frontend adapters 208 of the director units 204 may additionally be connected via a global shared memory.

Referring again to FIG. 2, a host 202 sends requests for data access (read or write) which are received at one or more of the director units 204. The data access request is for one or more data elements which are on one or more of the logical volumes 230. The backup engine 206 includes a mapping or list that associates the data elements of the logical volumes 230 to the actual physical storage volume 210 of the data based on the I/O range of the data element. For example, if the host wishes to update or backup a data file, the mapping will indicate to the backup engine 206 which physical storage volumes 210 include data blocks for that data file. In some embodiments, mapping between data elements of the logical volumes and the physical storage volumes may be user configurable, where the mapping information may be created by an administrator when a storage device or storage appliance is deployed. For example, storage appliances may be deployed as cloud-based storage that can be provisioned and assigned to backup or store data of particular clients, for example, as part of storage as a service or software-defined storage. An administrator, for example, via a management portal, can configure or assign a particular storage device or storage volume to one more clients (e.g., hosts, or data sets) by mapping the physical storage to one or more logical volumes or data sets associated with that particular client. Similarly, one or more physical storage devices or volumes can also be mapped to a particular logical volume. A physical storage device or volume can be mapped to a particular logical volume, client, or data set based on a variety of parameters or rules, such as, for example, geographic locations, load balance, or quality of service (QoS), etc. The mapping configuration information may be stored in a persistent storage device and accessible by the backup engines during backup operations.

The backup engine 206, using this mapping data, determines the one or more physical storage locations that the requested data element is located on. When one or more of the physical storage locations are located on the physical storage volume 210 that is local to the (i.e., on the same director unit 204 as the) backup engine 206, the backup engine 208a is able to send a message to the local frontend adapter 208 to execute the data access request on the local physical storage volume 210. This type of direct local access is the fastest type of access to a physical storage volume 210 and may occur via a super-fast connection, such as through shared memory between the backup engine 206 and frontend adapter 208. An example of this type of access is indicated by line 220.

When these physical storage locations are located on physical storage volumes 210 that are not on the same director unit 204 as the backup engine 206 that received the data access request (i.e., remote physical storage volumes 210), the backup engine 206 transmits one or more messages to the corresponding (remote) frontend adapters 208 that are on the director units 204 that include the physical storage volumes 210 indicated by the physical storage locations. The communication between the local backup engine 206 and the remote frontend adapter 208 may be via interconnect 218, or may be through another communications means such as a global shared memory.

This type of remote access (e.g., 222) is not necessarily as fast as the access indicated in 220, however it is faster than the approach of having the local frontend adapter 208 communicate with the remote physical storage volume 210 directly as indicated by arrow 224. This may be due to a variety of reasons. For example, a request from a frontend adapter to a remote physical storage volume may not have optimal command queuing, or may not utilize cache as well, or may require additional I/O, etc.

The remote access approach indicated by 222 is also faster than the traditional access approach where the backup engine is a hardware unit located separately from the hardware unit that includes the frontend adapter. In such a traditional approach, the backup engine has no knowledge of the logical to physical mapping of data in the logical volume 230 as the mapping data may be large in size and may change constantly and thus transmitting it constantly from the frontend adapter to the backup engine would be infeasible. For example, the storage system may be constantly shifting frequently used data to faster physical storage volumes and seldom used data to slower physical storage volumes, which causes the mapping data to change constantly. Thus, the frontend adapter that the backup engine sends the data access request to is not likely to be the most optimal frontend adapter for the data, as that frontend adapter is not likely to be the one that is local to the desired physical storage volume that has the requested data.

Figure 3:
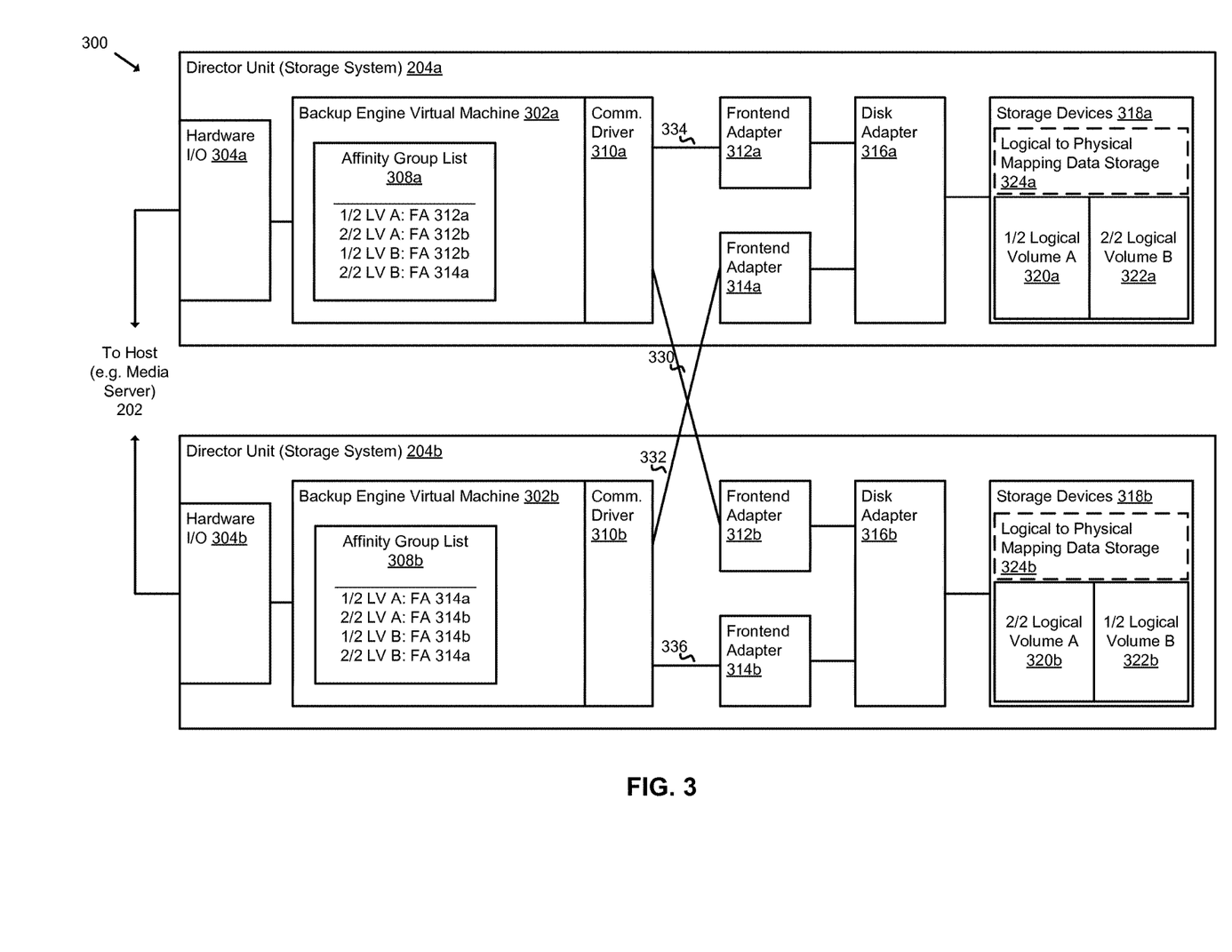
FIG. 3 is a block diagram illustrating a system 300 for an improved active-active storage array according to an embodiment of the invention.

FIG. 3 is a block diagram illustrating a system 300 for an improved active-active storage array according to an embodiment of the invention. System 300 presents a more detailed view of an embodiment of the invention compared to system 200 in FIG. 2. To avoid obscuring the invention, only two director units 204 are shown in system 300. However, the invention may include additional director units 204 as needed.

Referring to FIG. 3, each director unit 204 includes a hardware I/O device 304. This device provides the I/O between the components of the director unit 204 and the host 202. Each director unit 204 may include multiple hardware I/O devices 304, allowing multiple hosts 202 to communicate with the director unit 204.

The hardware I/O unit 304 is connected to the backup engine virtual machine (VM) 302. The backup engine VM is software on an operating system, such as Linux, that performs operations related to data access. In some embodiments, the VM executes on general purpose computer hardware, such as a computer system including a dual core CPU or two separate CPUs. In some embodiments, this backup engine VM performs one or more of the operations described with reference to the backup engine 206 of FIG. 2.

The backup engine VM 302 also includes an affinity group list 308. An affinity group is referred to as metadata or mapping information describing the relationship or association information amongst a logical volume, a frontend adapter, a disk adapter, and a physical storage volume. In some embodiments, this is the same as the mapping information described with reference to FIG. 2. The data in this list is received by the backup engine VM 302 from one or more of the frontend adapters 312 or 314. The frontend adapters know the mapping or association between the address ranges of a particular data element in a logical volume and the physical storage device that stores that data element. The frontend adapters can transmit this information to the backup engine VM 302 such that the backup engine VM 302 may also know this information. This is possible in part because the backup engine VM 302 shares a high speed shared memory interface with the local frontend adapter(s). Without this interface, the transfer of this mapping information, which is constantly changing, would be prohibitively expensive.

Exemplary affinity group lists 308a and 308b are shown in FIG. 3 to illustrate how such a list might be implemented. Backup engine VM 302a includes affinity group list 308, which indicates how the different exemplary logical volumes (e.g., LV's A and B) can be accessed from backup engine VM 302a. For example, affinity group list 308 indicates that the first section 320a of out of the two sections of logical volume A, which is stored locally, can be accessed via frontend adapter 312a from backup engine VM 302a, and that the second section 320b of logical volume A, which is stored remotely at director 204b, can be accessed through frontend adapter 312b via interconnect 330. A combination of a logical volume section, a selected backup engine VM, a corresponding frontend adapter, and the associated devices and modules (e.g. associated storage devices) may be referred to as an affinity group. Although the logical volumes are expressed as "sections" in FIG. 3 for ease of understanding, the affinity group list 308 may instead store the various I/O ranges or address block ranges for each logical volume that corresponds to each of the respective storage devices. Furthermore, in some embodiments, a backup engine VM 302 includes multiple affinity group lists (e.g., one for each logical volume, or including the affinity group lists for other backup engine VMs).

In some embodiments, the frontend adapter(s) 312-314 store the mapping data in one or more of the storage devices 318. For example, storage device 318 may store logical to physical mapping data at storage 324b. When the backup engine VM 302 requests the mapping data from the frontend adapter, the frontend adapter may retrieve the information from this storage location. In other embodiments, the mapping data is stored in a separate location unrelated to the storage devices 318, or may be stored within a storage medium in the frontend adapter itself.

The backup engine VM 302a is connected to a communications driver 310. This driver may reside on a VM as well, and this VM may be backup engine VM 302. As the backup engine is rendered in software as VM in director unit 204, in place of a physical cable connection between the backup engine and the frontend adapter, a software driver, such as communications driver 310, may be used instead. In some embodiments, this communications driver is known as a cut through driver.

The communications driver communicates with the various frontend adapters of the various director units 204 in the system 300. In the exemplary illustration of FIG. 300, the communications driver 310a is connected to frontend adapter 312a using shared memory connection 334, and to frontend adapter 312b using interconnect 330. The communications driver 310b is connected to frontend adapter 314b using shared memory connection 336, and to frontend adapter 314a using interconnect 330. In some embodiments, the interconnects 330 and 332 are established through the use of a global shared memory.

Frontend adapters 312a-b and 314a-b act as the interface between the software components of the director unit 204 (e.g., backup engine VM and the communications driver) and the hardware storage elements of the system (e.g. disk adapter 316 and storage devices 318). Frontend adapters 312 and 314 may be implemented in software, such as the VM of backup engine VM 302, or in hardware, or in a combination of both. Each director 204 may include more than one frontend adapter.

The frontend adapter may serve to route data received from the backup engine to an internal data bus. It may control a cache and also optimize I/O (e.g., command queuing) such that reads and writes to the storage devices are performed without unnecessary movement of the physical read mechanism on the storage device (e.g., a drive head for a hard drive).

Connected to the one or more frontend adapters are the disk adapters 316. In some embodiments the disk adapters 316 are known as backend adapters. The disk adapters communicate with the various storage devices 318 through one or more physical ports (not shown) using one or more storage communications protocols (e.g., Fibre Channel) and also communicates with the frontend adapter 312. In some embodiments, additional devices, such as a cache, may reside between the frontend adapters 312-314, and the disk adapters 316. The disk adapters 316 may also provide error detection and correction mechanisms, and may also coordinate any redundant disk arrays.

The disk adapters 316 are connected to the storage devices 318 using one or more storage communications protocols. The storage devices 318 may include more than one individual storage device, and may be a combination of different types of storage devices. Examples of storage devices include hard drives, magnetic tape drives, optical storage media, and other storage devices as described with reference to FIG. 14. Each storage device 318 may include portions of one or more logical volumes. For example, the exemplary storage devices 318 include the first section 320a of logical volume A and the second section 322a of logical volume B. Although two logical volumes and two sets of storage devices are depicted in FIG. 3, in other embodiments of the invention, an arbitrary number of storage devices 318 on an arbitrary number of director units 204 may include an arbitrary arrangement or distribution of logical volumes. Additionally, the logical volumes may not need to be equally distributed between the storage devices.

Referring again to the exemplary system 300 in FIG. 3, when a data access request (e.g., a read or write request) from the host 202 arrives at the hardware I/O unit 304, the hardware I/O unit passes the request to the backup engine VM 302. The backup engine VM 302 performs deduplication and compression on the data access request if needed (e.g., if the data access request is a write request). The backup engine VM 302 determines the proper set of frontend adapters 312-314 to send the request to based on the I/O range or address range of the data element(s) in the data access request based on the affinity group list stored in the backup engine VM 302. For example, if the data access request is received at backup engine VM 302b, and if the address range of the data element in the data access request is determined by the backup engine VM 302b to be in the first and second (address range) sections of logical volume A, then the backup engine VM 302b transmits data access requests to the corresponding frontend adapters (FA 314a and FA 314b) for the respective sections of the data element requested in the data access request.

Continuing the example, the data access request is processed by the corresponding frontend adapters (e.g. FA 314a-b), disk adapters (e.g., DA 316a-b), and storage devices (e.g., storage devices 318a-b), and depending on the type of the data access request (e.g., a read or write), a different response (e.g., data or success/failure confirmation) is sent by the storage devices, disk adapters, and corresponding frontend adapters back to the backup engine VM 302b via the communications driver 310b.

Using this method, the system 300 can choose the most optimal path for each data element. Furthermore, having the backup engine VM communicate with a remote frontend adapter is more efficient than having a frontend adapter communicate with a remote disk adapter.

Figure 4:
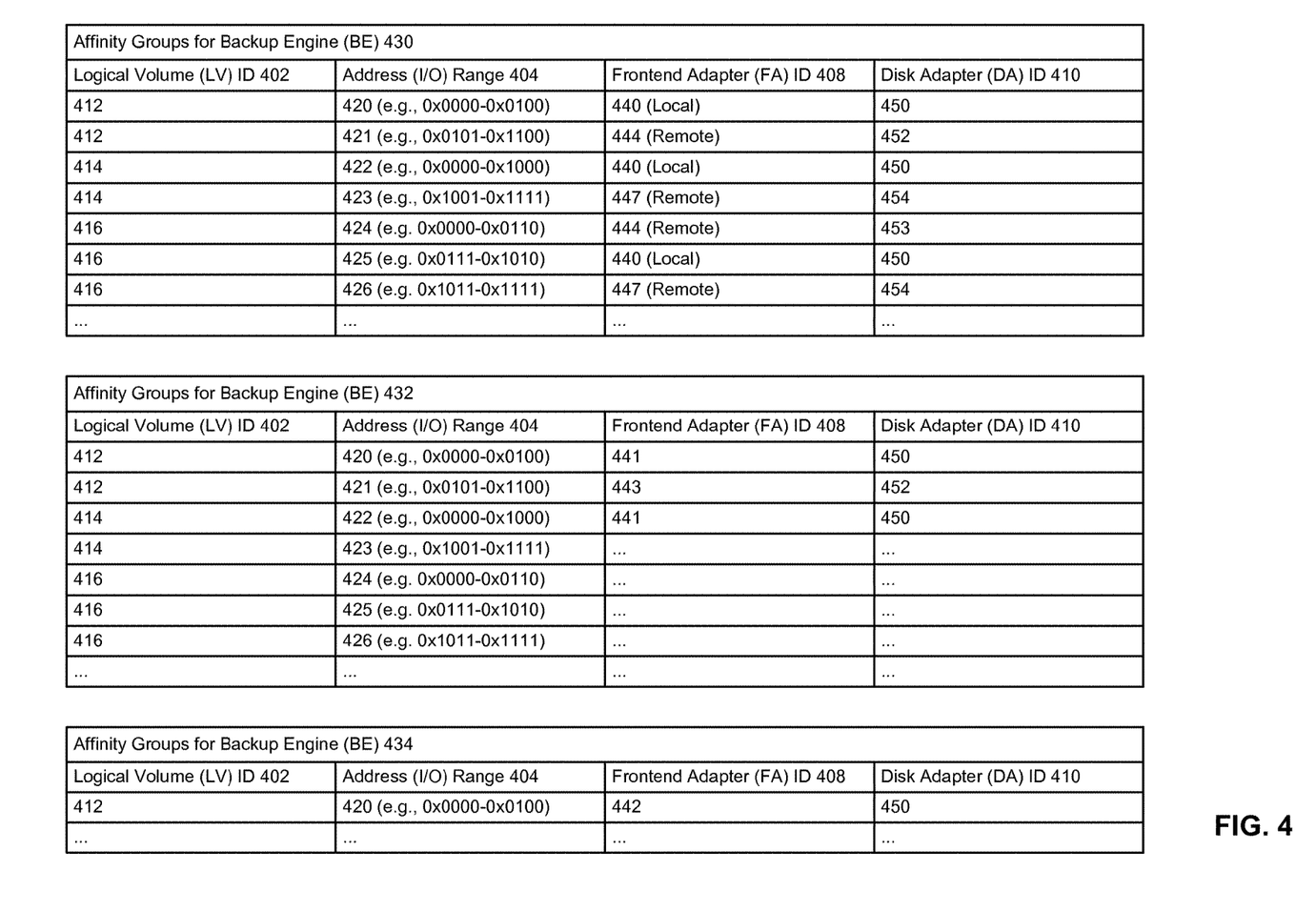
FIG. 4 illustrates a series of tables showing exemplary affinity group lists for three exemplary backup engines according to an embodiment of the invention.

FIG. 4 illustrates a series of tables showing exemplary affinity group lists for three exemplary backup engines according to an embodiment of the invention. The physical layout of the array shown in FIG. 4 is further shown in FIG. 5.

FIG. 4 depicts three exemplary logical volumes (LV), 412, 414, and 416. Each LV is split on the various storage devices of the system according to different address ranges as indicated by the address range column 404. A backup engine VM (BE), such as BE 430, may determine the frontend adapter to send a data access request for a particular data element by looking up the address range of the data element in an affinity group list, such as the affinity group for backup engine 430 list shown in FIG. 4.

As an example, if BE 430 receives a data access request for a data element in LV 412 in address range 0x0000-0x0010, then that data element falls under address range 420, and the BE 430 sends the data access request to FA 440 (which is linked to DA 450). As another example, if BE 430 receives a data access request for a data element for LV 414 with address range 0x01010-0x01100, then based on the affinity group list for BE 430 in FIG. 4, BE 430 would send a request to FA 440 and FA 447 as the data element spans two physical volumes.

Figure 5:
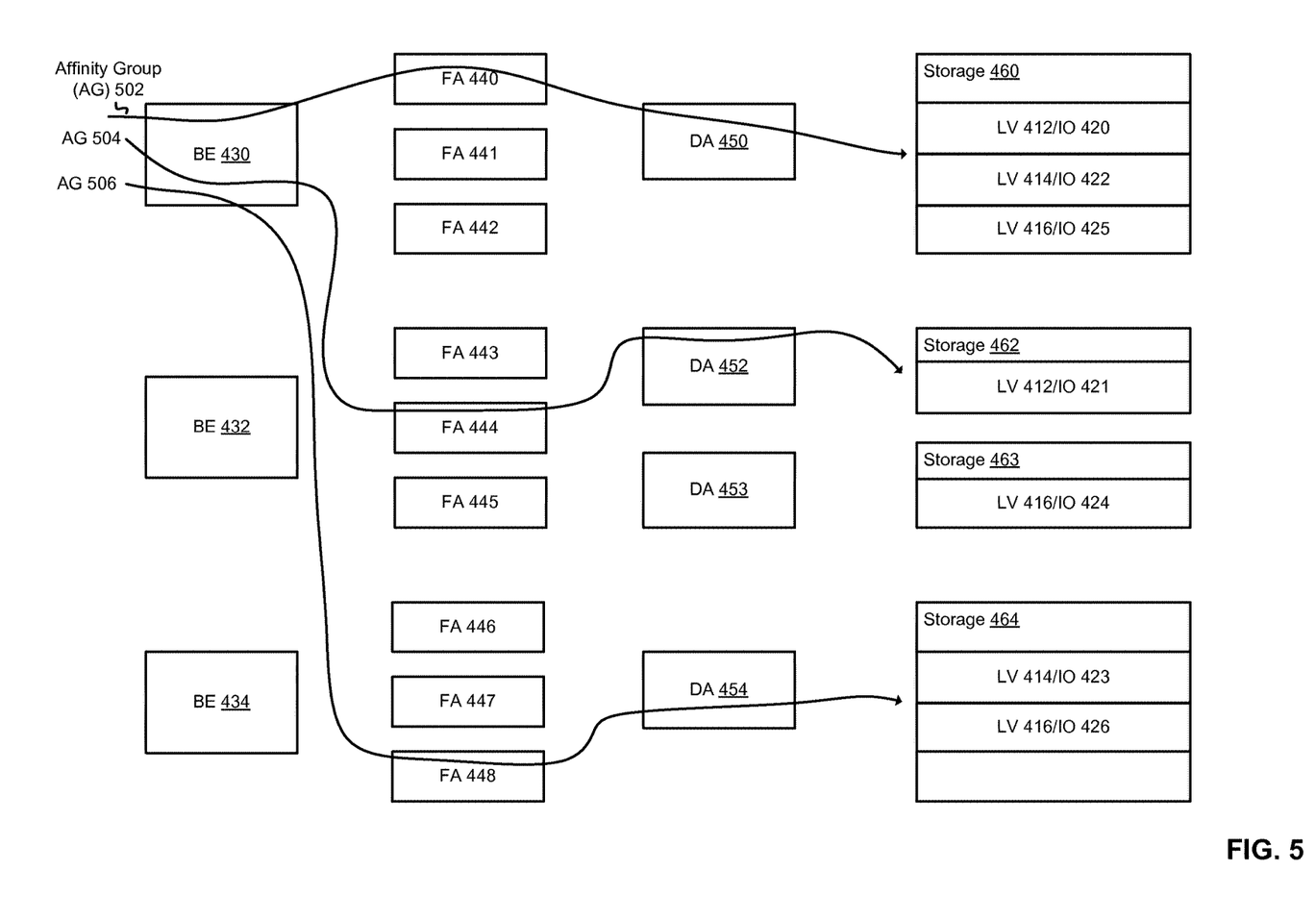
FIG. 5 is a block diagram illustrating the affinity groups shown in FIG. 4.

FIG. 5 is a block diagram illustrating the affinity groups shown in FIG. 4. Although the backup engine, frontend adapter, disk adapter, and storage media may be part of one or more director units and may be connected to other components, the illustration is simplified in Figured 5 so as not to obscure the invention. Those FAs, Das, and storage media to the immediate right of the respective BEs are local to the BE (i.e., on the same director unit).

As can be seen in FIG. 5, affinity group 502 is composed of BE 430, FA 440, and DA 450. This is the same set of elements indicated by the first, third, and eighth lines of the list for the affinity groups for BE 430 as indicated in FIG. 4. Note that affinity group 502 is local to the BE 430. Two other affinity groups, AG 504, and AG 506, also exist for BE 430, although they pass through remote FAs.

Note that although a particular configuration of BEs, FAs, DAs, and storage media are shown, in other embodiments the system may have a different configuration of these elements, in one to one, many to one, one to many, or many to many combinations.

Figure 6:
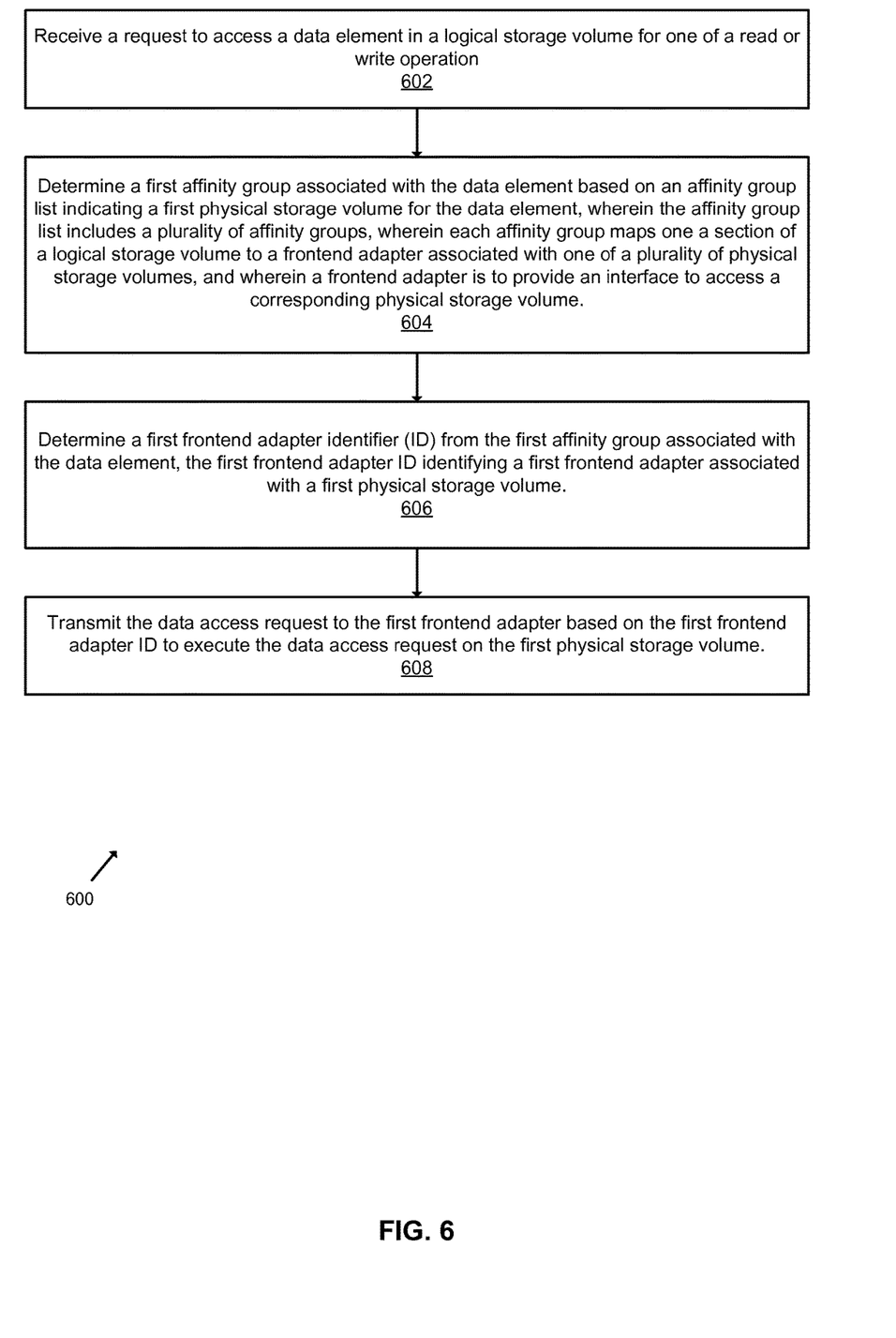
FIG. 6 is a flow diagram illustrating a method 600 for improved active-active storage array according to an embodiment of the invention.

FIG. 6 is a flow diagram illustrating a method 600 for improved active-active storage array according to an embodiment of the invention. In some embodiments, method 600 is performed by a backup engine VM (e.g., backup engine VM 302). The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

At block 602, the method includes receiving a data access request for a data element in a logical storage volume for one of a read or write operation. At block 604, the method includes determining a first affinity group associated with the data element based on an affinity group list indicating a first physical storage volume for the data element, wherein the affinity group list includes a plurality of affinity groups, wherein each affinity group maps a section of a logical storage volume to a frontend adapter associated with one of a plurality of physical storage volumes, and wherein a frontend adapter is to provide an interface to access a corresponding physical storage volume.

At 606, the method includes determining a first frontend adapter identifier (ID) from the first affinity group associated with the data element, the first frontend adapter ID identifying a first frontend adapter associated with a first physical storage volume.

At 608, the method includes transmitting the data access request to the first frontend adapter based on the first frontend adapter ID to execute the data access request on the first physical storage volume.

In some embodiments, the backup engine is connected to a local physical storage volume via a local frontend adapter, and wherein the backup engine is a software component executing on a virtual machine on general purpose hardware components on a director unit, and wherein the director unit is one of a plurality of director units in an active-active storage array.

In some embodiments, the logical storage volume spans a plurality of physical storage volumes in the active-active storage array.

In some embodiments, the backup engine is connected to remote frontend adapters via a high speed interconnect, and wherein the high speed interconnect is one of a Infiniband connection and a global shared memory.

In some embodiments, the method further includes determining a second affinity group associated with the data element based on the affinity group list indicating a second physical storage volume for the data element, determining a second frontend adapter identifier (ID) from the second affinity group associated with the data element, the second frontend adapter ID identifying a second frontend adapter associated with a second physical storage volume, and transmitting the data access request to the second frontend adapter based on the second frontend adapter ID to execute the data access request on the second physical storage volume.

In some embodiments, the affinity group identifies the section of the logical storage volume by the address range of that section in the logical storage volume.

In some embodiments, each physical volume is connected to a back end adapter, and wherein a communication between the backup engine and a remote front end adapter is faster than a communication between a local front end adapter and a remote back end adapter.

Figure 7:
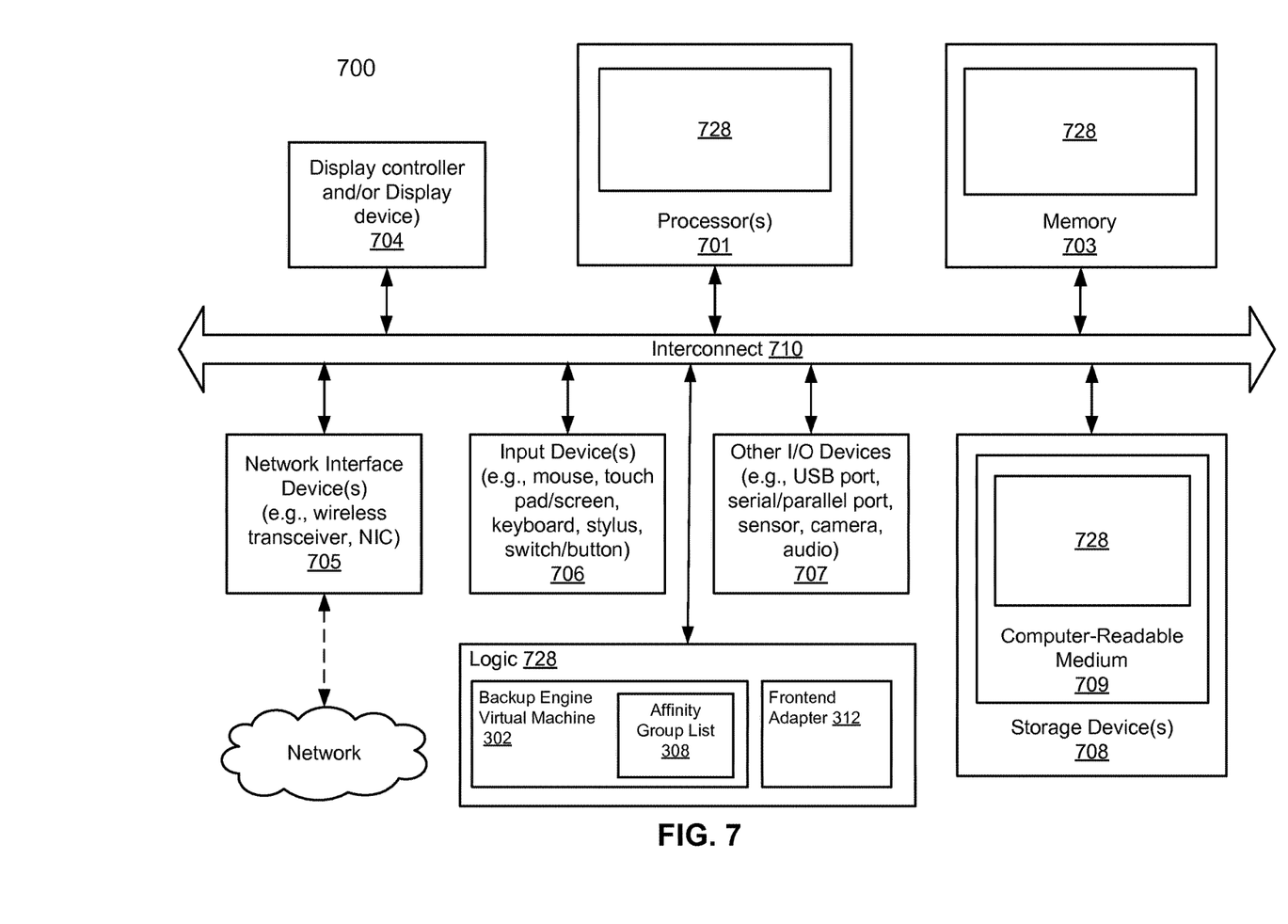
FIG. 7 is a block diagram illustrating an example of a data processing system which may be used with one embodiment of the invention.

FIG. 7 is a block diagram illustrating an example of a data processing system which may be used with one embodiment of the invention. For example, system 700 may represents any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra low voltage processor, may act as a main processing unit and central hub for communication with the various components of the system. Such processor can be implemented as a system on chip (SoC). Processor 701 is configured to execute instructions for performing the operations and steps discussed herein. System 700 further includes a graphics interface that communicates with graphics subsystem 704, which may include a display controller, a graphics processor, and/or a display device.

Processor 701 may communicate with memory 703, which in an embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices 705-708, including network interface device(s) 705, input device(s) 706, and other IO device(s) 707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., physical keyboard or a virtual keyboard displayed as part of a touch sensitive screen). For example, input device 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-accessible storage medium 709 (also known as a machine-readable storage medium or a computer-readable medium) on which is stored one or more sets of instructions or software (e.g., module, unit, and/or logic 728) embodying any one or more of the methodologies or functions described herein. For example, logic 728 may be a backup engine VM 302 as described with reference to FIG. 3, and may store affinity group lists such as affinity group list 308. Module/unit/logic 728 may further include logic for the operation of a communications driver 310 as described with reference to FIG. 3, and may include the software components for the operation of the frontend adapter 312-14 as described with reference to FIG. 3. Logic 728 may also reside, completely or at least partially, within memory 703 and/or within processor 701 during execution thereof by data processing system 700, memory 703 and processor 701 also constituting machine-accessible storage media. Module/unit/logic 728 may further be transmitted or received over a network via network interface device 705.

Computer-readable storage medium 709 may also be used to store the some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 728, components and other features described herein can be implemented as discrete hardware components or integrated in the functionality of hardware components such as ASICS, FPGAs, DSPs or similar devices. In addition, module/unit/logic 728 can be implemented as firmware or functional circuitry within hardware devices. Further, module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method in a backup engine, comprising:
   receiving at a first backup engine of a first director unit a data access request for a data element in a logical storage volume for one of a read or write operation;
   determining at the first backup engine a first affinity group associated with the data element based on an affinity group list indicating a first physical storage volume for the data element, wherein the affinity group list includes a plurality of affinity groups, wherein each affinity group includes a logical volume identifier, a data element address range, a frontend adapter identifier, and a disk adapter identifier, and wherein each affinity group maps a data element address range of a logical storage volume to a frontend adapter associated with one of a plurality of physical storage volumes, and wherein a frontend adapter is to provide an interface to access a corresponding physical storage volume, and wherein the first affinity group is determined based at least on a data element address associated with the data element request and a data element address range associated with the first affinity group;
   determining at the first backup engine a first frontend adapter identifier (ID) from the first affinity group associated with the data element, the first frontend adapter ID identifying a first frontend adapter associated with a first physical storage volume, wherein the first frontend adapter is a remote frontend adapter and the first physical storage volume is a remote physical storage volume associated with a second backup engine of a second director unit; and
   transmitting the data access request to the first frontend adapter of the second director unit based on the first frontend adapter ID to execute the data access request on the first physical storage volume;
   wherein the backup engine is connected to a local physical storage volume via a local frontend adapter, and wherein the backup engine is a software component executed on a virtual machine on general purpose hardware components on a director unit, and wherein the director unit is one of a plurality of director units in an active-active storage array.

2. The method of claim 1, wherein the logical storage volume spans a plurality of physical storage volumes in the active-active storage array.

3. The method of claim 1, wherein the backup engine is connected to remote frontend adapters via a high speed interconnect, and wherein the high speed interconnect is one of a Infiniband connection and a global shared memory.

4. The method of claim 1, further comprising:
   determining a second affinity group associated with the data element based on the affinity group list indicating a second physical storage volume for the data element;
   determining a second frontend adapter identifier (ID) from the second affinity group associated with the data element, the second frontend adapter ID identifying a second frontend adapter associated with a second physical storage volume; and
   transmitting the data access request to the second frontend adapter based on the second frontend adapter ID to execute the data access request on the second physical storage volume.

5. The method of claim 1, wherein each affinity group identifies a section of the logical storage volume by the address range of a section in the logical storage volume.

6. The method of claim 1, wherein each physical storage volume is connected to a back end adapter, and wherein a communication between the backup engine and a remote front end adapter is faster than a communication between a local front end adapter and a remote back end adapter.

7. A director unit, comprising:
   a processor; and
   a memory coupled to the processor for storing instructions, which when executed from the memory, cause the processor to perform the operations of a backup engine, and wherein the operations are to:
   receive at a first backup engine of a first director unit a data access request for a data element in a logical storage volume for one of a read or write operation;
   determine at the first backup engine a first affinity group associated with the data element based on an affinity group list indicating a first physical storage volume for the data element, wherein the affinity group list includes a plurality of affinity groups, wherein each affinity group includes a logical volume identifier, a data element address range, a frontend adapter identifier, and a disk adapter identifier, and wherein each affinity group maps a data element address range of a logical storage volume to a frontend adapter associated with one of a plurality of physical storage volumes, and wherein a frontend adapter is to provide an interface to access a corresponding physical storage volume, and wherein the first affinity group is determined based at least on a data element address associated with the data element request and a data element address range associated with the first affinity group;
   determine at the first backup engine a first frontend adapter identifier (ID) from the first affinity group associated with the data element, the first frontend adapter ID identifying a first frontend adapter associated with a first physical storage volume, wherein the first frontend adapter is a remote frontend adapter and the first physical storage volume is a remote physical storage volume associated with a second backup engine of a second director unit; and
   transmit the data access request to the first frontend adapter of the second director unit based on the first frontend adapter ID to execute the data access request on the first physical storage volume;
   wherein the backup engine is connected to a local physical storage volume via a local frontend adapter, and wherein the backup engine is a software component executed on a virtual machine on general purpose hardware components on a director unit, and wherein the director unit is one of a plurality of director units in an active-active storage array.

8. The director unit of claim 7, wherein the logical storage volume spans a plurality of physical storage volumes in the active-active storage array.

9. The director unit of claim 7, wherein the backup engine is connected to remote storage adapters via a high speed interconnect, and wherein the high speed interconnect is one of a Infiniband connection and a global shared memory.

10. The director unit of claim 7, wherein the operations are further to:
   determine a second affinity group associated with the data element based on an affinity group list indicating a second physical storage volume for the data element;
   determine a second frontend adapter identifier (ID) from the second affinity group associated with the data element, the second frontend adapter ID identifying a second frontend adapter associated with a second physical storage volume; and transmit the data access request to the second frontend adapter based on the second frontend adapter ID to execute the data access request on the second physical storage volume.

11. The director unit of claim 7, wherein each affinity group identifies a section of the logical storage volume by the address range of the section in the logical storage volume.

12. The director unit of claim 7, wherein each physical storage volume is connected to a back end adapter, and wherein a communication between the backup engine and a remote front end adapter is faster than a communication between a local front end adapter and a remote back end adapter.

13. A non-transitory machine-readable storage medium having instructions stored therein, which when executed by a processor, cause the processor to perform operations of a backup engine, the operations comprising:

receiving at a first backup engine of a first director unit a data access request for a data element in a logical storage volume for one of a read or write operation;

determining at the first backup engine a first affinity group associated with the data element based on an affinity group list indicating a first physical storage volume for the data element, wherein the affinity group list includes a plurality of affinity groups, wherein each affinity group includes a logical volume identifier, a data element address range, a frontend adapter identifier, and a disk adapter identifier, and wherein each affinity group maps a data element address range of a logical storage volume to a frontend adapter associated with one of a plurality of physical storage volumes, and wherein a frontend adapter is to provide an interface to access a corresponding physical storage volume, and wherein the first affinity group is determined based at least on a data element address associated with the data element request and a data element address range associated with the first affinity group;

determining at the first backup engine a first frontend adapter identifier (ID) from the first affinity group associated with the data element, the first frontend adapter ID identifying a first frontend adapter associated with a first physical storage volume, wherein the first frontend adapter is a remote frontend adapter and the first physical storage volume is a remote physical storage volume associated with a second backup engine of a second director unit; and transmitting the data access request to the first frontend adapter of the second director unit based on the first frontend adapter ID to execute the data access request on the first physical storage volume;

wherein the backup engine is connected to a local physical storage volume via a local frontend adapter, and wherein the backup engine is a software component executed on a virtual machine on general purpose hardware components on a director unit, and wherein the director unit is one of a plurality of director units in an active-active storage array.

14. The non-transitory machine-readable storage medium of claim 13, wherein the logical storage volume spans a plurality of physical storage volumes in the active-active storage array.

15. The non-transitory machine-readable storage medium of claim 13, wherein the backup engine is connected to remote frontend adapters via a high speed interconnect, and wherein the high speed interconnect is one of a Infiniband connection and a global shared memory.

16. The non-transitory machine-readable storage medium of claim 13, further comprising:

determining a second affinity group associated with the data element based on the affinity group list indicating a second physical storage volume for the data element;

determining a second frontend adapter identifier (ID) from the second affinity group associated with the data element, the second frontend adapter ID identifying a second frontend adapter associated with a second physical storage volume; and transmitting the data access request to the second frontend adapter based on the second frontend adapter ID to execute the data access request on the second physical storage volume.

17. The non-transitory machine-readable storage medium of claim 13, wherein each affinity group identifies a section of the logical storage volume by the address range of the section in the logical storage volume.

18. The non-transitory machine-readable storage medium of claim 13, wherein each physical storage volume is connected to a back end adapter, and wherein a communication between the backup engine and a remote front end adapter is faster than a communication between a local front end adapter and a remote back end adapter.

* * * * *